(12) United States Patent
Cui et al.

(10) Patent No.: US 8,527,762 B2
(45) Date of Patent: Sep. 3, 2013

(54) METHOD FOR REALIZING AN AUTHENTICATION CENTER AND AN AUTHENTICATION SYSTEM THEREOF

(75) Inventors: Zhenfeng Cui, Shenzhen (CN); Zhijun Bian, Shenzhen (CN); Xi Chen, Shenzhen (CN)

(73) Assignee: ZTE Corporation, Shenzen, Guangdong (CN)

( * ) Notice: Subject to any disclaimer, the term of this patent is extended or adjusted under 35 U.S.C. 154(b) by 66 days.

(21) Appl. No.: 13/145,222

(22) PCT Filed: Sep. 15, 2009

(86) PCT No.: PCT/CN2009/073942
§ 371 (c)(1),
(2), (4) Date: Jul. 22, 2011

(87) PCT Pub. No.: WO2010/083685
PCT Pub. Date: Jul. 29, 2010

(65) Prior Publication Data
US 2011/0283106 A1 Nov. 17, 2011

(30) Foreign Application Priority Data
Jan. 22, 2009 (CN) .......................... 2009 1 0105248

(51) Int. Cl.
*H04L 9/32* (2006.01)
(52) U.S. Cl.
USPC .......................................................... 713/168
(58) Field of Classification Search
None
See application file for complete search history.

(56) References Cited

U.S. PATENT DOCUMENTS 6,243,811 B1 * 6/2001 Patel .............................. 713/167
8,234,715 B2 * 7/2012 Zollinger et al. ............... 726/29
(Continued)

FOREIGN PATENT DOCUMENTS

| CN | 1529531 A | 9/2004 |
|----|-----------|--------|
| CN | 1747382 A | 3/2006 |

(Continued)

OTHER PUBLICATIONS

3rdGeneration Partnership Project; Technical Specification Group Services and System Aspects; Liberty Alliance and 3GPP security interworking; Interworking of Liberty Alliance Identity Federation Framework (ID-FF), Identity Web Services Framework (ID-FF), Identity Web Services Framework (ID-WSF) and Generic Authentication Architecture (GA, 3GPP Standard; 3GPP TR 33.980, 3rd Generation Partnership Project (3GPP) Mobile Competence Centre; 650, route Des Lucioles; F-06921 Sophia-Antipolis Cedex; France.

(Continued)

*Primary Examiner* — Jeffrey Pwu
*Assistant Examiner* — Carlos Amorin
(74) *Attorney, Agent, or Firm* — Brooks Kushman, P.C.

(57) ABSTRACT

A method for realizing an authentication center (AC) and an authentication system are disclosed. The method comprises: a UE sends an authentication request to an AC and applies for temporary authentication information, the AC assigns a first authentication random code to the UE, then the UE calculates a first response code and sends it to the AC, the AC assigns the temporary authentication information to the UE after authentication and authorization; the UE sends a login request to the application system (AS) which assigns a second authentication random code to the UE, and the UE uses it and the temporary authentication information to calculate a second response code, and sends this code to the AS; the AS sends the second response code to the AC for authentication and authorization; the AC returns the authentication result to the AS which in turn returns the authentication result to the UE.

19 Claims, 2 Drawing Sheets

(56) References Cited

U.S. PATENT DOCUMENTS

| | | |
|---|---|---|
| 2004/0264699 A1 | 12/2004 | Meandzija et al. |
| 2005/0287990 A1 | 12/2005 | Mononen et al. |
| 2006/0089123 A1* | 4/2006 | Frank .......................... 455/411 |
| 2007/0254624 A1* | 11/2007 | Le Creff et al. ............ 455/404.1 |
| 2008/0273704 A1* | 11/2008 | Norrman et al. .............. 380/278 |
| 2009/0191844 A1* | 7/2009 | Morgan et al. ................ 455/411 |
| 2009/0265554 A1* | 10/2009 | Robles et al. ................. 713/168 |
| 2012/0046048 A1* | 2/2012 | Copeland et al. .......... 455/456.1 |
| 2012/0221524 A1* | 8/2012 | Auchmoody et al. ........ 707/640 |

FOREIGN PATENT DOCUMENTS

| | | |
|---|---|---|
| CN | 1983071 A | 6/2007 |
| CN | 101188606 A | 5/2008 |
| CN | 101483525 A | 7/2009 |
| EP | 1770940 A1 * | 4/2007 |
| EP | 1909430 A1 | 9/2008 |
| WO | WO 2005060150 A1 * | 6/2005 |

OTHER PUBLICATIONS

Application No. EP 09838652, Supplemental European Search Report, Dated Mar. 11, 2013.

* cited by examiner

METHOD FOR REALIZING AN AUTHENTICATION CENTER AND AN AUTHENTICATION SYSTEM THEREOF

CROSS-REFERENCE TO RELATED APPLICATION

This application is the U.S. national phase of PCT Application No. PCT/CN2009/073942 filed Sep. 15, 2009 which claims priority to Chinese Application No. 200910105248.3 filed Jan. 22, 2009, the disclosures of which are incorporated in their entirety by reference herein.

TECHNICAL FIELD

The present invention belongs to the field of user ID authentication, and more especially, to a method for realizing a user ID authentication center in an multi-application system with relatively high security requirements and an authentication system thereof.

BACKGROUND OF THE RELATED ART

With the development of industry services, the number of industry service application systems increases rapidly. To date, the user ID authentication is implemented by the application system of each service in most cases, therefore, in order to access different application systems, the user has to input his/her user credence to different application systems respectively. In the case that the number of application systems increases rapidly and marketization develops very quickly, the disadvantage of this mode is more and more evident and becomes especially prominent particularly under the condition that the application system increases exponentially. Although the existing system has implemented unique authentication for the user ID, it is mainly by sending the response code and random code acquired by calculating the user token to the authentication center to perform authentication and authorization. If this information is intercepted, the trust of the authentication center can be gained unlimited by cheating, which brings severe threats to information security. Therefore, it is necessary to provide a method for realizing the authentication of the information security.

CONTENT OF THE INVENTION

The purpose of the present invention is to provide a method for realizing an authentication center with relatively high security performance and an authentication system to overcome the shortcomings in the prior art, the method provided in the present invention can not only uniquely authenticate the user ID, but also have enough security.

In order to solve the above technical problem, the present invention is implemented with the following technical scheme:

A method for realizing an authentication center, and the method comprises the following steps of:

A. a user equipment (UE) sending an authentication request to an authentication center (AC) and applying for temporary authentication information for logging in the application system, the AC assigning a first authentication random code to the UE, and the UE calculating a first response code according to this first authentication random code and sending the first response code to the AC, after the authenticating and authorizing the UE, the AC assigning the temporary authentication information to the UE;

B. the UE sending a login request to the application system, and the application system assigning a second authentication random code to the UE, the UE calculating a second response code according to the second authentication random code and said temporary authentication information, and sending the second response code to the application system;

C. the application system sending the second response code to the authentication center, and the authentication center performing authentication and authorization; and D. the authentication center returning the authentication result to the application system, and the application system returns the authentication result to the UE.

In the above method, said first and said second authentication codes can exist in the form of MD5 (message-digest algorithm 5).

In the above method, MD5 and SHA1 (Secure Hash Algorithm) combined algorithm can be used in the step of calculating the first and the second response codes.

In the above method, said temporary authentication information might comprise the UE account, the application system ID and a temporary token.

In the above method, said temporary authentication information might be featured with uniqueness and timeliness, and it is valid for about one minute.

In the above step A, the authentication center might directly use a symmetrical secure encryption algorithm, secure socket layer (SSL), or transport layer security (TLS) to transmit the temporary authentication information which is assigned to the UE.

Said symmetrical encryption algorithm that can be directly used might be data encryption standard (DES), triple DES (3DES) or advanced encryption standard (AES).

In said step C, if the authentication is passed successfully, the authentication center might clear said temporary authentication information.

In addition, the present invention also provides an authentication center, a user equipment, an application system and an authentication system to solve the above technical problem.

The authentication center, configured to:

receive an authentication request as well as an application for temporary authentication information for logging in the application system from the UE, assign a first authentication random code to said UE, receive a first response code calculated according to said first authentication random code and sent by said UE, and assign said temporary authentication information to said UE after the authentication and authorization;

receive a second response code from said application system and perform authentication and authorization, wherein, said second response code is calculated out by said UE according to the second authentication random code assigned by the application system and the temporary authentication information after said UE sends a login request to the application system; and return the authentication result to said application system, so that said application system can return the authentication result to said UE.

In said authentication center, said temporary authentication information might comprise the UE account, the application system ID and a temporary token.

In said authentication center, said temporary authentication information is featured with uniqueness and timeliness.

Said authentication center is also configured to receive the second response code sent by said application system, and clear said temporary authentication information if the authentication is passed successfully when performing the authentication and authorization.

The user equipment, configured to:

send an authentication request to the authentication center and apply for temporary authentication information for logging in the application system, receive the first authentication random code assigned by said authentication center, calculate the first response code according to said first authentication random code and send said first response code to said authentication center, receive said temporary authentication information assigned by the authentication center after the authentication and authorization;

send a login request to said application system, receive the second authentication random code assigned by the application system, calculate said second response code according to said second authentication random code and said temporary authentication information, and send said second response code to said application system; and receive the authentication result returned from said application system, wherein said authentication result is returned by said authentication center to the application system after said application system sends the second response code to the authentication center and said authentication center performs the authentication and authorization.

The application system, which is configured to:

respond the login request sent from the UE, assign the second authentication random code to said UE, receive the second response code sent from said UE, wherein said second response code is calculated out by said UE using said second authentication random code and the temporary authentication information, wherein said temporary authentication information is assigned by said authentication center after authentication and authorization based on the first response code calculated out by said UE according to the first authentication random code assigned by said authentication center and sent by the user equipment after said UE sends an authentication request to the authentication center and applies for temporary authentication information for logging in the application system;

sending said second response code to said authentication center, and after authentication and authorization are performed in said authentication center, receive the authentication result returned from said authentication center, and send the authentication result to said UE.

An authentication system, comprising the above authentication center, the UE and the application system.

Using the method for implementing an authentication center in accordance of the present invention has the following benefit effects:

Since the temporary token is generated according to a specific application system and it has timeliness, it can guarantee the security of the user temporary authentication information, furthermore, the method for implementing the authentication center has enough security.

PREFERRED EMBODIMENTS OF THE PRESENT INVENTION

In order to understand the present invention better, the present invention will be illustrated in further detail in combination with the accompanying figures and embodiments.

Figure 1:
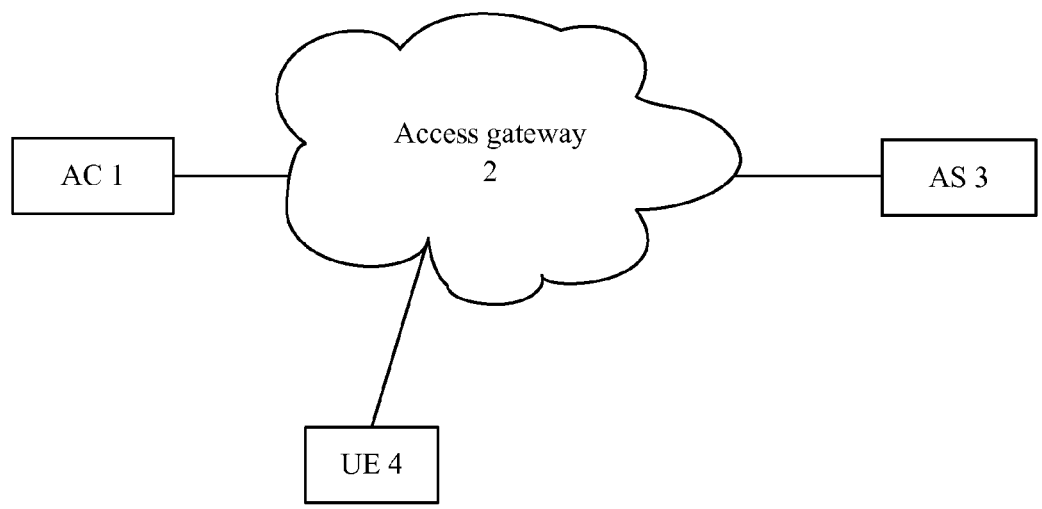
FIG. 1 is a networking schematic diagram of the authentication system in accordance with the present invention.

Refer to FIG. 1, the authentication system comprises client UE 4, application server AS 3 (corresponding to the application system) and authentication center AC 1 which are connected together via access gateway 2. FIG. 1 takes the UE as an example, and UE 4 uses the services offered by AS3; AC1 is used to authenticate and authorize UE4.

Figure 2:
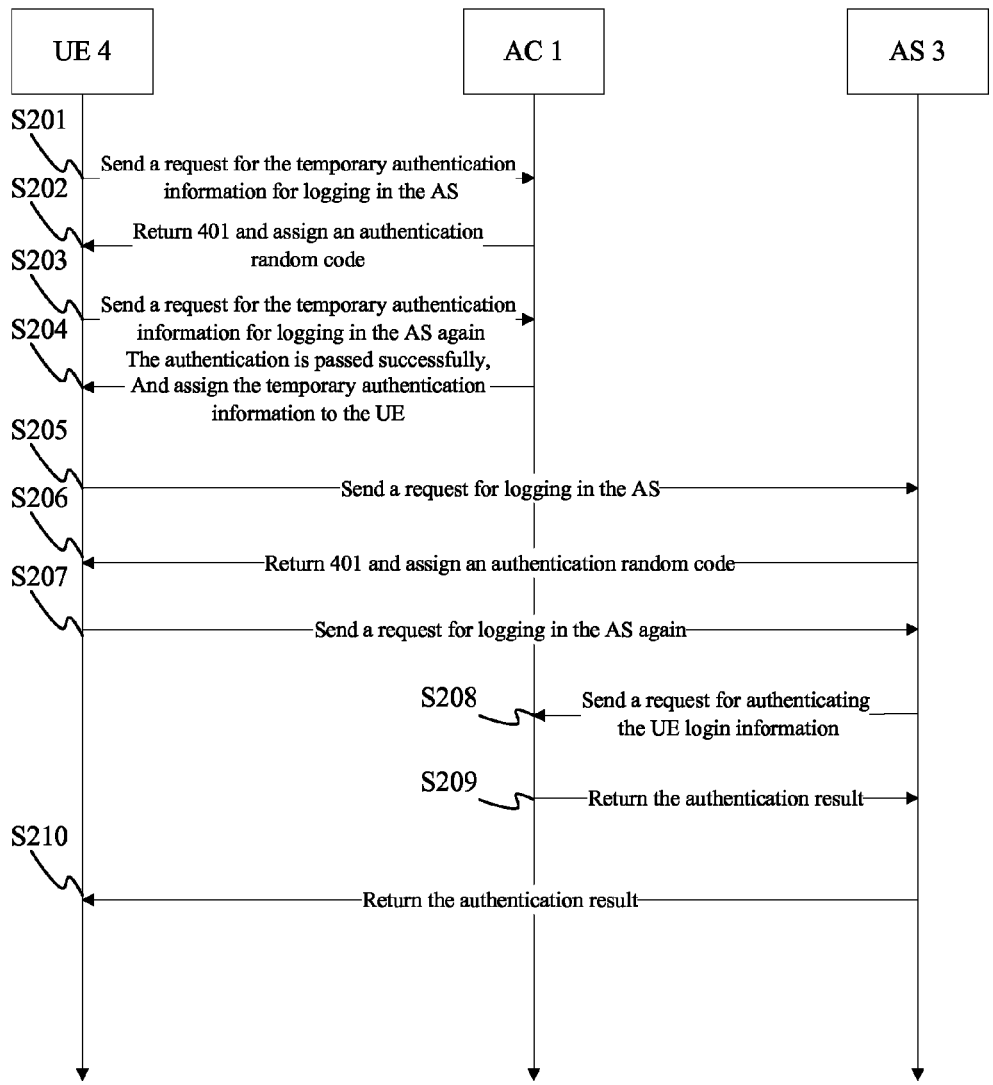
FIG. 2 is a flow chart of signaling of each network element in the authentication system of the present invention.

Refer to FIG. 2 which is a flow chart of signaling of each network element in the authentication system of the present invention, it takes the hypertext transfer protocol (HTTP) as the interface between the UE and the AC, and takes the simple object access protocol (SOAP) between the AS and the AC as an example to describe the flow chart of the implementation of the authentication center, and the implementation comprises the following steps:

Step 201: Before using the AS service officially, the UE sends an authentication request to the AC, meanwhile it applies for temporary authentication information for logging in the AS;

Step 202: the AC returns 401 (request for authentication) and assigns an authentication random code;

Step 203: the UE uses the authentication random code assigned by the AC to calculate a response code, and sends the response code to the AC;

Step 204: the AC authenticates and authorizes the UE, and assigns the UE the temporary authentication information for logging in the AS, where the temporary authentication information comprises the UE account, the application system ID (the AS ID) and a temporary token. Wherein, the AS ID is the identifier assigned to the AS by the AC, and it is a globally unique identifier (GUID); in order to securely send the temporary authentication information to the UE, the following secure modes can be applied:

1) directly use a symmetrical encryption algorithm

The encryption algorithm comprises DES, 3DES, AES, and so on, wherein, the DES has high speed and is suitable to scenarios of encrypting a lot of data and systems with relatively low security requirements; the 3DES is based on the DES, uses three different tokens to encrypt a block of data for three times, has higher security, and is used to the systems with relatively high security requirement; the AES is the next generation encryption algorithm standard and has high speed, high security level, and is suitable to encrypt digital information in the fields of finance, telecommunication and government;

2) SSL/TLS

Step 205: the UE sends a login request to the AS;

Step 206: the AS returns 401 (i.e. requests for authentication), and assigns an authentication random code; considering the token security, the authentication random codes of the AC and AS can be saved in the form of MD5, and the MD5 and SHA1 combined encryption algorithm can be used to calculate the response code, which is more secure;

Step 207: the UE uses the authentication random code assigned by the AS and the temporary authentication information assigned by the AC to calculate a response code and sends the response code to the AS;

Step 208: the AS sends the response code of the UE to the AC transparently;

Step 209: the AC performs the authentication and authorization according to the application identifier of the AS and the response code transparently transmitted by the AS, and returns the authentication result to the AS, if the authentication is passed successfully, the AC clears the temporary authentication information;

Step 210: the AS returns the authentication result to the UE.

In the above process, the temporary authentication information is uniquely assigned by the AC according to the AS which the UE accesses, and it is unique and has timeliness (the valid period is about one minute), and can be used only once, which largely increases the security of the authentication.

The above description is only preferred embodiments rather than the restriction of the scope of the present invention, and it should be pointed out that, for those skilled in the field, any modifications, equivalent alternatives and improvement made within the spirit and essence of the present invention should belong to the scope of the claims of the present invention.

INDUSTRIAL APPLICABILITY

In the present invention, since the temporary token is generated according to a specific application system, and the token has timeliness, it can guarantee the security of the user temporary authentication information, so that the method for implementing the authentication center has enough security.

What is claimed is:

1. A method for realizing an authentication center, the method comprising:
   (A) a user equipment sending an authentication request to an authentication center and applying for temporary authentication information for logging in an application system, the authentication center assigning a first authentication random code to the user equipment, and the user equipment calculating a first response code according to the first authentication random code and sending the first response code to the authentication center, after authenticating and authorizing the user equipment, the authentication center assigning the temporary authentication information to the user equipment;
   (B) the user equipment sending a login request to the application system, and the application system assigning a second authentication random code to the user equipment, the user equipment calculating a second response code according to the second authentication random code and said temporary authentication information, and sending the second response code to the application system;
   (C) the application system sending the second response code to the authentication center, and the authentication center performing authentication and authorization; and
   (D) the authentication center returning an authentication result to the application system, and the application system returning the authentication result to the user equipment.

2. The method of claim 1 wherein said first and said second authentication random codes exist in a form of message-digest algorithm MD5.

3. The method of claim 2 wherein message-digest algorithm MD5 and secure hash algorithm SHA1 combined algorithm are used in the step of calculating the first and the second response codes.

4. The method of claim 1 wherein message-digest algorithm MD5 and secure hash algorithm SHA1 combined algorithm are used in the step of calculating the first and the second response codes.

5. The method of claim 4 wherein said temporary authentication information comprises a user equipment account, an application system identifier and a temporary token.

6. The method of claim 5 wherein said temporary authentication information is unique and has a valid time period.

7. The method of claim 5 wherein, in the step (A), the step of the authentication center assigning the temporary authentication information to the user equipment comprises transmitting the temporary authentication information by way of a symmetrical secure encryption algorithm or a secure socket layer (SSL)/transport layer security (TLS).

8. The method of claim 7 wherein said symmetrical encryption algorithm that is directly used is data encryption standard (DES), triple data encryption standard (3DES) or advanced encryption standard (AES).

9. The method of claim 1 wherein, in the step of the authentication center performing authentication and authorization in said step (C), the authentication center clears said temporary authentication information if the authentication is passed successfully.

10. An authentication center comprising a memory storing the following instructions:
    receiving an authentication request as well as an application for temporary authentication information for logging in an application system from a user equipment;
    assigning a first authentication random code to said user equipment;
    receiving a first response code calculated according to said first authentication random code and sent by said user equipment;
    assigning said temporary authentication information to said user equipment after authentication and authorization;
    receiving a second response code from said application system, wherein, said second response code is calculated out by said user equipment according to the second authentication random code assigned by the application system and the temporary authentication information after said user equipment sends a login request to the application system;
    performing authentication and authorization; and
    returning an authentication result to said application system, so that said application system can return the authentication result to said user equipment; and
    at least one processor executing the instructions stored by the memory.

11. The authentication center of claim 10 wherein said temporary authentication information comprises a user equipment account, an application system identifier and a temporary token.

12. The authentication center of claim 10 wherein said temporary authentication information is featured with uniqueness and timeliness.

13. The authentication center of claim 10 further including memory storing the following instructions:
    receiving a second response code sent by said application system, and
    clearing said temporary authentication information if the authentication is passed successfully when performing authentication and authorization.

14. A user equipment comprising a memory storing the following instructions:
    sending an authentication request to an authentication center and applying for temporary authentication information for logging in an application system;
    receiving a first authentication random code assigned by said authentication center;
    calculating a first response code according to said first authentication random code;
    sending said first response code to said authentication center;
    receiving said temporary authentication information assigned by the authentication center after authentication and authorization;

sending a login request to said application system;
receiving a second authentication random code assigned by the application system;
calculating said second response code according to said second authentication random code and said temporary authentication information;
sending said second response code to said application system; and
receiving an authentication result returned from said application system, wherein said authentication result is returned by said authentication center to the application system after said application system sends the second response code to the authentication center and said authentication center performs authentication and authorization; and
at least one processor executing the instructions stored by the memory.

15. An application system comprising a memory storing the following instructions:
responding to a login request sent from a user equipment;
assigning a second authentication random code to said user equipment;
receiving a second response code sent from said user equipment, wherein said second response code is calculated out by said user equipment using said second authentication random code and temporary authentication information, wherein said temporary authentication information is assigned by said authentication center after authentication and authorization based on a first response code calculated by said user equipment according to a first authentication random code assigned by said authentication center and sent by the user equipment after said user equipment sends an authentication request to the authentication center and applies for temporary authentication information for logging in an application system;
sending said second response code to said authentication center;
receiving an authentication result returned from said authentication center after authentication and authorization are performed in said authentication center; and
sending the authentication result to said user equipment; and
at least one processor executing the instructions stored by the memory.

16. An authentication system, comprising an authentication center, a user equipment and an application system wherein,
the authentication center comprises:
a memory storing the following instructions:
receiving an authentication request as well as an application for temporary authentication information for logging in said application system from said user equipment, assigning a first authentication random code to said user equipment, receiving a first response code calculated according to said first authentication random code and sent by said user equipment, and assigning said temporary authentication information to said user equipment after authentication and authorization;
receiving a second response code from said application system and performing authentication and authorization, wherein said second response code is calculated by said user equipment according to the second authentication random code assigned by the application system and the temporary authentication information after said user equipment sends a login request to said application system; and
returning an authentication result to said application system, so that said application system can return the authentication result to said user equipment; and
at least one processor executing the instructions stored by the memory;
the user equipment comprises:
a memory storing following instructions:
sending the authentication request to said authentication center and applying for temporary authentication information for logging in said application system, receiving the first authentication random code assigned by said authentication center, calculating the first response code according to said first authentication random code and send said first response code to said authentication center, receiving said temporary authentication information assigned by the authentication center after authentication and authorization;
sending the login request to said application system, receiving the second authentication random code assigned by said application system, calculating said second response code according to said second authentication random code and said temporary authentication information, and sending said second response code to said application system; and
receiving the authentication result returned from said application system, wherein said authentication result is returned by said authentication center to the application system after said application system sends the second response code to the authentication center and said authentication center performs authentication and authorization; and
one processor executing the instructions stored by the memory; and
the application system comprises:
a memory storing following instructions:
responding the login request sent from said user equipment, assigning the second authentication random code to said user equipment, receiving the second response code sent from said user equipment, wherein said second response code is calculated out by said user equipment using said second authentication random code and temporary authentication information, wherein said temporary authentication information is assigned by said authentication center after authentication and authorization based on the first response code calculated by said user equipment according to the first authentication random code assigned by said authentication center and sent by the user equipment after said user equipment sends the authentication request to the authentication center and applies for temporary authentication information for logging in an application system;
sending said second response code to said authentication center, and after authentication and authorization are performed in said authentication center, receiving the authentication result returned from said authentication center, and sending the authentication result to said user equipment; and
at least one processor executing the instructions stored by the memory.

17. The authentication system of claim 16 wherein said temporary authentication information comprises a user equipment account, an application system identifier and a temporary token.

18. The authentication system of claim 16 wherein said temporary authentication information is featured with uniqueness and timeliness.

19. The authentication system of claim 16 wherein the authentication center further includes memory storing the following instructions:
   receiving a second response code sent by said application system, and clearing said temporary authentication information if the authentication is passed successfully when performing authentication and authorization.

\* \* \* \* \*